UNITED STATES PATENT OFFICE.

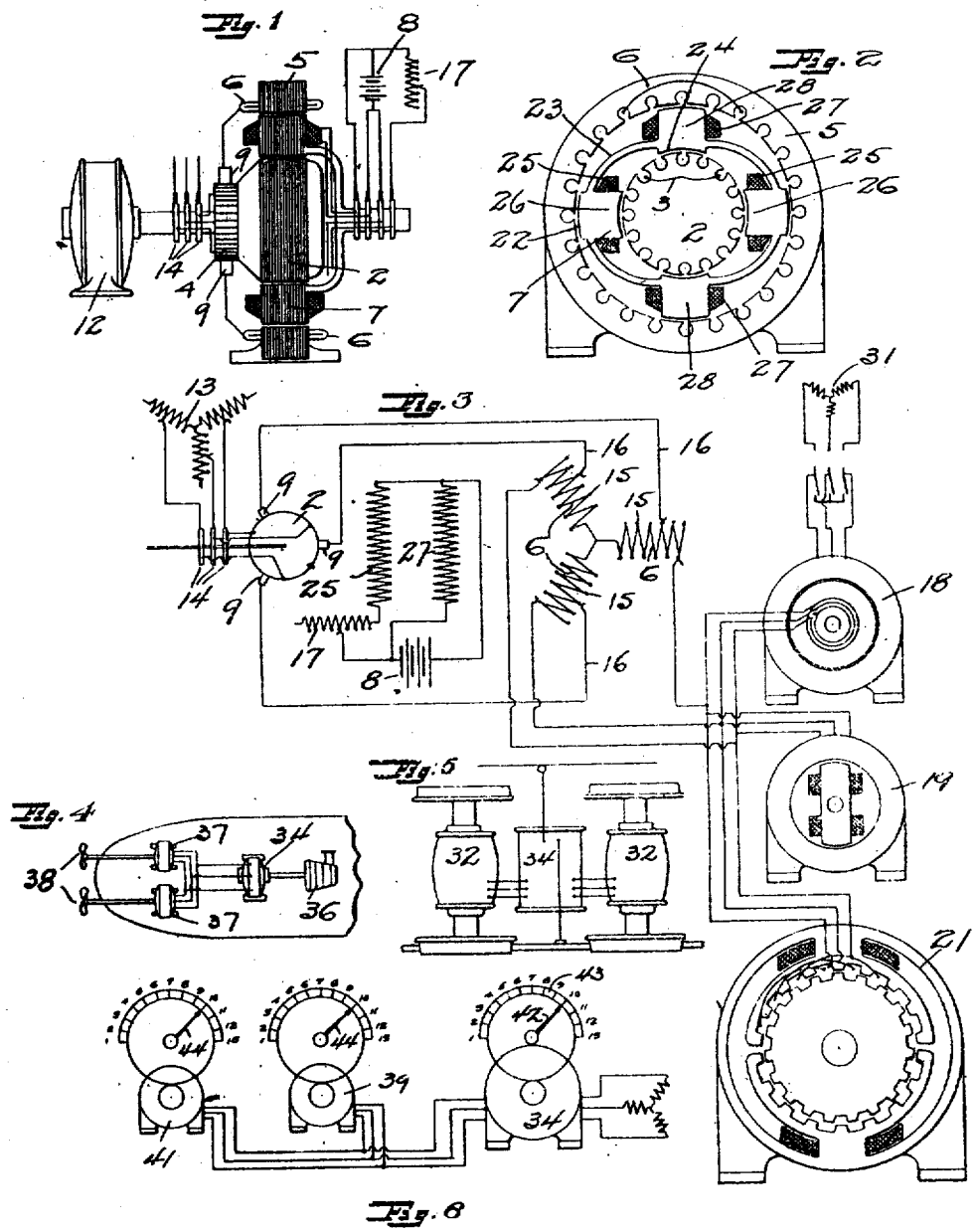

ALFONS H. NEULAND, OF SAN FRANCISCO, CALIFORNIA.

VARIABLE-FREQUENCY DYNAMO-ELECTRIC MACHINE.

1,334,502.  Specification of Letters Patent.  Patented Mar. 23, 1920.

Application filed August 8, 1916. Serial No. 113,709.

*To all whom it may concern:*

Be it known that I, ALFONS H. NEULAND, a subject of the Czar of Russia, and a resident of the city and county of San Francisco, State of California, have invented a certain new and useful Variable-Frequency Dynamo-Electric Machine, of which the following is a specification.

The invention relates to dynamo electric machines and particularly to means for controlling the speed of synchronous and induction motors.

An object of the invention is to provide means for controlling the speed of synchronous and induction motors.

Another object of the invention is to provide a controlling apparatus, the speed of which may be varied and adjusted to supply the motors with currents of proper frequency and voltage at the various speeds.

Another object of the invention is to provide for the coöperation of the controlling apparatus, with motors of various types and for various purposes.

The invention possesses other advantageous features, some of which, with the foregoing, will be set forth at length in the following description where I shall outline in full that form of the invention which I have selected for illustration in the drawings accompanying and forming part of the present specification. In the drawings I have shown only one specific form of my generic invention, but it is to be understood that I do not limit myself to such form because my invention as expressed in the claims may be embodied in a multiplicity of forms.

In the drawings:

Figure 1 is a diagrammatic vertical section of the apparatus provided with means for driving it mechanically or electrically.

Fig. 2 is a diagrammatic cross section of the apparatus.

Fig. 3 is a diagrammatic representation of the circuits of the apparatus and various types of motors connected thereto and controlled thereby.

Fig. 4 is a diagrammatic representation of a marine propulsion system employing the apparatus of my invention.

Fig. 5 is a similar view of a railway drive.

Fig. 6 is a diagrammatic illustration of the apparatus and controlled motors showing means for indicating co-extensive movement of the rotors of the controller and motors.

The apparatus of the present invention, in some respects resembles the power transmission apparatus shown and described in detail in my United States Letters Patent Number 1,242,714, dated October 9, 1917, and the adjustable speed motor shown and described in detail in my United States Letters Patents Numbers 1,233,899 and 1,233,900, issued July 7, 1917, to which reference is hereby made for a description of certain features of the present apparatus. The apparatus of the present invention comprises an armature 2 provided with a winding 3 and a commutator 4 of any suitable type, a stator 5 surrounding the armature and provided with a winding 6 and a rotatable field element 7 arranged between the stator and armature and energized by a direct current from a suitable source, such as the battery 8. A set of polyphase brushes 9 wiping the commutator are connected to the stator winding to conduct the current from the armature to the stator.

The armature may be driven by a prime mover, such as the motor 12 or may be driven by electrical energy from a suitable source 13 of alternating current which is fed into the armature through the slip rings 14.

When the armature 2 is driven at a substantially constant speed by the prime mover, as shown in Fig. 1, and the field energized, a current is generated in the armature which is collected by the brushes 9 and fed into the polyphase stator winding 6, causing the field element 7 to rotate. The current at the brushes, which has been unidirectional as long as the field was at rest, becomes alternating as soon as the field begins to rotate, and the frequency of this current depends on and is proportional to the speed of the field element. The armature, therefore, in this case, is the generator of a variable frequency, while the stator and the field operate like a synchronous motor supplied with a variable frequency.

The speed of the field and the corresponding frequency which the apparatus produces is controlled and fixed by a balance of the generated armature voltage and the counter electromotive force of the stator windings. The stator winding is preferably connected for three phase and in star fashion and in order that the balance of the generated voltage and the counter E. M. F. may be varied to produce a variation in the delivered frequency, each phase of the stator winding is provided with taps 15 so that the turns in series connected across the armature brushes can be varied.

The slip between the armature and field is greatest and the voltage at the brushes is highest, when the field is stationary, and since when the field is stationary there is no relative movement between the field and the stator winding, the counter voltage of the stator windings is zero. Therefore a strong current circulates through this circuit including the armature and stator windings, and forces the field to rotate. The rotation of the field decreases the slip and the armature voltage, and at the same time generates a counter voltage in the stator winding until the speed of the field reaches a point where the counter voltage approaches the armature voltage, whereupon the current decreases to a small value sufficient only to overcome the friction of the idly rotating field element.

The speed of the field cannot increase after this balance has been reached and the frequency at the brushes is thus fixed, but the frequency is changed as soon as this balance is disturbed which is accomplished by connecting the brush leads 16 to other taps 15 of the stator winding. By so doing the counter voltage is increased or decreased and is accompanied by a decreased or increased speed of the field as well as a changed frequency at the brushes.

In addition to the frequency steps which are obtained by varying the number of turns of the stator winding in series across the brushes, intermediate graduations can be obtained by varying the strength of the field by the insertion of a variable resistance 17.

So far I have confined my description to the apparatus and have shown how it can, when driven by a prime mover of constant speed, be made to supply at will, up to a certain limit, current of any desired frequency. This variable frequency current I utilize for driving, at a fixed or an adjustable speed, independent of the load, alternating current motors of either the induction or the synchronous type.

In Fig. 3 I have shown the arrangement of connections between the apparatus and the motors to be controlled, an induction motor 18, a synchronous motor 19 and a Neuland motor 21, the latter motor being shown and described in my U. S. Patent No. 1,178,455. It is to be understood that the apparatus may be designed to operate at a high speed or at a speed which is most convenient or efficient, while the motors may be constructed for a different number of poles and made to operate at a different speed from that of the controller. In many instances, such as in rolling mills and ship drives, it is necessary that the motors operate at a very low speed in which cases I prefer to employ the Neuland motor. The Neuland motor shown in Fig. 3 has a two pole field, a four pole armature and a frequency per revolution determined by the number of rotor teeth, which makes it particularly adapted to low speed high torque work. The brush leads 16 of the apparatus connect to the three phase stator winding and the motor terminals are connected to the extreme leads of the stator windings.

The motors may be supplied with an approximately constant potential at the varying frequency and speed. This is the case when the connections are as shown in Fig. 3 and the field of the apparatus remains constant, resulting in currents circulating through the motors which are very powerful on low speed and which decrease with increasing speed so that the torque of the motor in this case is very great at start and low speed and diminishes with increasing speed. Such a characteristic of the motor will be very useful for certain applications.

For ordinary applications I prefer to vary, that is, to increase the voltage supplied to the motor approximately in proportion to the increased frequency and motor speed, resulting in a substantially constant current in the motor and consequently a constant torque at all speeds.

This is accomplished by the use of a particular field construction shown in Fig. 2 in which the external pole faces 22 are connected by a yoke 23 to the adjacent internal pole faces 24. The coils 25 on the inner pole pieces 26 form a circuit and the coils 27 on the outer pole pieces 28 form a circuit, so that the current in each circuit can be independently varied and the strength of the armature field can be decreased without decreasing the stator field. In this way, when the motor is to be started the armature field is weakened, generating only a low voltage at the brushes and limiting the inrush of current to the motor at start and at low speeds. As the motor speed is increased the armature field of the master controller is proportionately strengthened by varying the resistance 17 until at high speed it reaches its full value.

The energy to the motor is supplied by the armature of the apparatus alone at standstill of the motor, by the stator winding of the apparatus alone at the highest speed of the motor and by the armature and stator at any intermediate speed. In the first case, the brush leads are connected to the outermost taps on the stator winding so that the brush leads are connected directly to the motor leads. In the second case, the brush leads have been moved inward on the stator winding to the innermost taps, thereby short circuiting the armature brushes, in which case the armature drives the field element as a clutch and the rotation of the field against the stator generates the energy supplied to the motor. In the third case the brush leads are connected to points on the stator winding other than the extreme taps, so that the increasing field speed, while lowering the voltage in the armature, also serves to step it up in the stator winding which acts as an auto-transformer, maintaining or even increasing the motor terminal voltage, so that part of the energy is generated by the armature and part by the stator winding.

I have heretofore assumed the apparatus to be driven by a prime mover in order to generate current for the motor. It has, however, great flexibility, and is capable of being used in various ways and for various purposes, only a few of which can here be described or pointed out. Thus, for instance, the apparatus may be supplied from a source of current 13 and operate as a converter instead of being driven by a prime mover. In Fig. 3 of the drawings I have shown how a three phase alternating current of constant frequency may be fed into the apparatus through slip rings 14 mounted on the armature shaft and connected to the armature winding. In this case, before the apparatus is ready to deliver current to the motors, the armature must first be brought up to speed and synchronized with the field, by the application of external power or otherwise, after which the motor circuit is closed. At the starting the field element is stationary, causing direct current to be delivered at the commutator brushes, which is fed into the stator, causing the field element to rotate. Since the armature windings are connected to the stator windings and the current in the latter windings causes rotation of the field element, the armature is always in synchronous relation with the field.

Like most other electric machines, this apparatus, which has heretofore been described as converting a constant speed of rotation or a constant frequency current into a variable speed or variable frequency respectively, can be employed to effect changes vice versa, that is, change a variable frequency into a constant frequency. If the device is to operate in this capacity, the primary induction motor 18 shown in Fig. 3 is connected to a source 31 of constant frequency while the rotor of the motor is connected to the stator windings of the apparatus, which, after having its armature speeded up and synchronized with the field by the same or a similar source of constant frequency supply, operates to convert the variable frequency slip currents of the induction motor into a constant frequency and enabling the return of the current to the supply system.

Variations in speed of the induction motor are effected in the way heretofore described by means of changes in the stator winding and strength of field of the apparatus.

While it is here impossible to point out all the possible uses to which the present device may be applied, it is particularly adaptable for driving machine tools where the speed, once adjusted, must remain constant irrespective of the variations in load. It may be applied to electric locomotives, as shown in Fig. 5, where each axle may conveniently be provided with an ordinary squirrel-cage induction motor 32, all of them fed by the apparatus 34, which in this as in the preceding case may be operated as a converter from a single or polyphase constant frequency supply, or if preferred may be driven by a motor fed by a source of current supply, or again may be driven by any other prime mover such as an internal combustion engine. Furthermore, the trailers may also be provided with induction motors all connected to and fed and controlled by, the apparatus. An important advantage of this system for electric railways is that it may be used for regenerative braking and not only when coasting down grade but when slowing down for stops, since the braking can be very gradually applied, and unlike the braking obtained with the ordinary induction motor, in this system the full brake effect is available at any speed of the motors, which operate to return energy through the apparatus to the source of supply.

For ship drive, Fig. 4, where the apparatus 34 may be driven at a high speed by a steam turbine 36, supplying current to one or more synchronous or induction motors 37, driving the propellers 38. In this connection the control may be effected from the bridge of the vessel and the propellers will be prevented from racing or exceeding the speed for which they have been set.

Another important use which I here deem it necessary to touch upon is in connection with the apparatus 34 with one or more motors 39 and 41, which must be controlled from a central and more or less distant point, and at an exactly similar speed, in such a way that the apparatus 34 by its rotation will move a pointer 42 on a scale 43 so that it will indicate the exact relation to it of the motor shafts or the pointers 44 or the devices which they actuate, as for instance, in signaling or in controlling guns aboard warships when it is desired to adjust one or a number simultaneously from a central point.

For such a signal or gun control the motors must preferably be of the synchronous type so that their rotation would bear an exact relation to the apparatus even though they were wound for a different number of poles or were differently geared.

I claim:

1. An apparatus for controlling and adjusting the speed of an alternating current motor, comprising an armature provided with a winding, commutator and brushes, a stator provided with a winding which is connected to said brushes and a rotatable field element coöperating with the armature and stator, leads arranged to connect the stator winding with the motor and means for controlling and adjusting the speed of the rotatable field element.

2. An apparatus for controlling and adjusting the speed of an alternating current motor, comprising an armature provided with a winding, commutator and brushes, a stator provided with a winding which is connected to said brushes and a rotatable field element coöperating with the armature and stator, leads arranged to connect the stator winding with the motor, and means for varying the number of turns of the stator winding in series across the armature brushes.

3. An apparatus for controlling and adjusting the speed of an alternating current motor, comprising an armature provided with a winding, commutator and brushes, a stator provided with a winding which is connected to said brushes and a rotatable field element having a stator field winding and an armature field winding and means for varying the current in the armature field winding and leads arranged to connect the stator winding with the motor.

4. An apparatus for controlling and adjusting the speed of an alternating current motor, comprising an armature provided with a winding, commutator and brushes, a stator provided with a winding which is connected to said brushes and a rotatable field element having a stator field winding and an armature field winding and means for varying the current in the armature field winding, leads arranged to connect the stator winding with the motor, and means for varying the number of turns of the stator winding in series across the armature brushes.

5. An apparatus for controlling and adjusting the speed of an alternating current motor comprising an armature provided with a commutator and a winding arranged to have an electromotive force generated in or impressed thereon, brushes engaging said commutator, a stator provided with a winding which is connected to said brushes, a rotatable field element coöperating with said armature and stator and producing in the stator windings a counter electromotive force which balances the armature electromotive force and thereby determines the speed of the field element and means for varying the counter electromotive force whereby the speed of the field element is varied, the speed of the field element determining the frequency of the current in the armature winding.

6. An apparatus for controlling and adjusting the speed of an alternating current motor comprising an armature provided with a winding and commutator, polyphase brushes engaging the commutator, a stator provided with a polyphase winding to which the commutator brushes are connected, taps on the stator windings whereby the number of turns of the windings in series across the brushes may be varied, and a rotatable field element coöperating with said armature and stator, said stator windings being arranged to be connected to the motor.

7. An apparatus for controlling and adjusting the speed of an alternating current motor comprising an armature provided with a winding and commutator, polyphase brushes engaging the commutator, a stator provided with a polyphase winding to which the commutator brushes are connected, means for varying the number of turns of the stator winding in series across the armature brushes, a rotatable field element interposed between the armature and stator, independent armature field and stator field windings on said field element and motor leads arranged to be connected to the stator windings.

In testimony whereof I have hereunto set my hand at San Francisco, California, this 1st day of August, 1916.

ALFONS H. NEULAND.

In presence of—
H. G. Prost.